US012579992B2

(12) United States Patent
Wang et al.

(10) Patent No.: US 12,579,992 B2
(45) Date of Patent: Mar. 17, 2026

(54) NOISE REDUCTION DEVICE FOR AUDIO EQUIPMENT CAPABLE OF ACHIEVING TWO-WAY NOISE REDUCTION

(71) Applicant: LANTO ELECTRONIC LIMITED, Kunshan City (CN)

(72) Inventors: Hui-Yu Wang, Kunshan City (CN); Chi-Liang Chen, Kunshan City (CN); Tsung-Pao Hsu, Kunshan City (CN); Jung-Pin Chien, Kunshan City (CN)

(73) Assignee: LANTO ELECTRONIC LIMITED, Kunshan City (CN)

( * ) Notice: Subject to any disclaimer, the term of this patent is extended or adjusted under 35 U.S.C. 154(b) by 157 days.

(21) Appl. No.: 18/583,608

(22) Filed: Feb. 21, 2024

(65) Prior Publication Data

US 2024/0331712 A1 Oct. 3, 2024

(30) Foreign Application Priority Data

Mar. 28, 2023 (CN) ......................... 202310310409.2

(51) Int. Cl.
*G10L 21/0208* (2013.01)
*H04R 1/10* (2006.01)

(52) U.S. Cl.
CPC ........ *G10L 21/0208* (2013.01); *H04R 1/1041* (2013.01); *H04R 1/1083* (2013.01); *G10L 2021/02087* (2013.01)

(58) Field of Classification Search
CPC .............. G06F 3/162; G10K 11/17835; G10K 11/17873; G10K 11/17881;
(Continued)

(56) References Cited

U.S. PATENT DOCUMENTS 7,136,630 B2 * 11/2006 Xie ........................ H04M 1/656 704/214
8,223,986 B2 * 7/2012 Sander ................. H04R 1/1083 381/74
(Continued)

FOREIGN PATENT DOCUMENTS

CN 215956632 U 3/2022
CN 114449393 A 5/2022
(Continued)

*Primary Examiner* — Gerald Gauthier
(74) *Attorney, Agent, or Firm* — Birch, Stewart, Kolasch & Birch, LLP

(57) ABSTRACT

A noise reduction device for audio equipment includes a microprocessor, a digital signal processor, a host computer interface and an audio terminal. The digital signal processor is electrically connected to the microprocessor. The digital signal processor includes an uplink signal processing module and a downlink signal processing module. The host computer interface is configured to connect to a host computer. The host computer interface is electrically connected to the microprocessor. The audio connection terminal is configured to connect to the audio equipment. The audio connection terminal is electrically connected to the microprocessor. The uplink signal processing module is configured to perform noise reduction processing on an uplink signal of the audio equipment. The downlink signal processing module is configured to perform noise reduction processing on a downlink signal of the host computer.

20 Claims, 4 Drawing Sheets

(58) Field of Classification Search

CPC . G10K 11/1783; G10L 21/02; G10L 21/0208; G10L 25/78; G10L 25/84; G10L 2021/02087; H04B 3/23; H04B 10/25752; H04B 7/01; H04B 7/088; H04M 1/656; H04M 9/082; H04R 1/1041; H04R 1/1083; H04R 3/005; H04R 3/04; H04R 5/07; H04R 2430/00; H04R 3/002; H04L 5/0007; H04L 5/0048; H04L 5/0051; H04L 5/0094; H04W 24/10; H04W 68/005; H04W 74/0816; H04W 76/10

See application file for complete search history.

(56) References Cited

U.S. PATENT DOCUMENTS

| | | | | |
|---|---|---|---|---|
| 8,244,528 | B2 * | 8/2012 | Niemisto | G10L 25/78 704/214 |
| 8,447,595 | B2 * | 5/2013 | Chen | G10L 21/02 704/226 |
| 8,600,037 | B2 * | 12/2013 | Krishnaswany | H04M 9/082 704/226 |
| 9,100,090 | B2 * | 8/2015 | Zhang | H04B 3/23 |
| 9,129,586 | B2 * | 9/2015 | Bajic | G10K 11/17835 |
| 9,384,754 | B2 * | 7/2016 | Des Jardins | G10L 25/84 |
| 11,475,869 | B2 * | 10/2022 | Truong | G10K 11/17873 |
| 11,621,815 | B1 * | 4/2023 | Xu | H04L 5/0048 370/329 |
| 2011/0183702 | A1 * | 7/2011 | Weaver | H04W 52/242 455/522 |
| 2011/0301948 | A1 * | 12/2011 | Chen | G10L 25/78 704/E19.039 |
| 2012/0250913 | A1 | 10/2012 | Sander et al. | |
| 2013/0144617 | A1 * | 6/2013 | Murakami | G10L 21/02 704/226 |
| 2013/0191119 | A1 * | 7/2013 | Sugiyama | H04B 3/23 704/226 |
| 2013/0218558 | A1 * | 8/2013 | Kumar | H04M 9/082 704/226 |
| 2013/0246059 | A1 * | 9/2013 | Kechichian | G10L 21/0208 704/226 |
| 2013/0259250 | A1 * | 10/2013 | Nicholson | G10K 11/17881 381/71.6 |
| 2014/0072135 | A1 | 3/2014 | Bajic et al. | |
| 2014/0142935 | A1 * | 5/2014 | Lindahl | G10L 21/0208 704/226 |
| 2015/0340049 | A1 | 11/2015 | Zhang et al. | |
| 2019/0066652 | A1 * | 2/2019 | Yang | G10K 11/1783 |
| 2020/0351584 | A1 | 11/2020 | Zhou | |
| 2021/0160611 | A1 | 5/2021 | Balgemann et al. | |
| 2021/0407531 | A1 | 12/2021 | Des Jardins | |
| 2022/0225146 | A1 * | 7/2022 | Yoo | H04W 24/10 |
| 2022/0231804 | A1 * | 7/2022 | Brueck | H04W 24/10 |
| 2022/0368485 | A1 * | 11/2022 | Levitsky | H04L 5/0094 |
| 2023/0015161 | A1 | 1/2023 | Truong et al. | |
| 2023/0051021 | A1 * | 2/2023 | Nuzman | H04R 3/002 |
| 2023/0199840 | A1 * | 6/2023 | Zhang | H04W 74/0816 370/232 |
| 2023/0268957 | A1 * | 8/2023 | Sgraja | H04B 7/01 455/67.16 |
| 2023/0275715 | A1 * | 8/2023 | Paz | H04L 5/0007 370/329 |
| 2023/0276260 | A1 * | 8/2023 | Abedini | H04W 68/005 370/254 |
| 2023/0319588 | A1 * | 10/2023 | Zhu | H04B 7/088 370/329 |
| 2023/0362845 | A1 * | 11/2023 | Paz | H04W 76/10 |
| 2023/0370137 | A1 * | 11/2023 | Ly | H04L 5/0051 |
| 2024/0162987 | A1 * | 5/2024 | Guo | H04B 10/25752 |
| 2024/0163603 | A1 * | 5/2024 | Law | H04R 3/005 |
| 2024/0331712 | A1 * | 10/2024 | Wang | G10L 21/0208 |

FOREIGN PATENT DOCUMENTS

| | | | |
|---|---|---|---|
| EP | 2 721 804 | B1 | 8/2017 |
| WO | WO 2022/057385 | A1 | 3/2022 |

* cited by examiner

NOISE REDUCTION DEVICE FOR AUDIO EQUIPMENT CAPABLE OF ACHIEVING TWO-WAY NOISE REDUCTION

CROSS-REFERENCE TO RELATED APPLICATION

This patent application claims priority of a Chinese Patent Application No. 202310310409.2, filed on Mar. 28, 2023 and titled "NOISE REDUCTION DEVICE FOR AUDIO EQUIPMENT", the entire content of which is incorporated herein by reference.

TECHNICAL FIELD

The present disclosure relates to a noise reduction device for audio equipment, which belongs to the technical field of communication terminals.

BACKGROUND

Voice noise reduction mainly removes noise from a voice signal through noise reduction algorithms. Noise reduction products in the related art perform noise reduction processing on microphone paths. That is, the microphone on the product used by one party generates the voice signal. The voice signal is processed by a chip in the noise reduction product and transmitted to the other party. Since the voice signal transmitted to the other party has undergone noise reduction processing, the impact of whether the sound heard by the other party is clear or whether there is echo comes from the one party, but it does not optimize the quality of the audio heard by the one party.

SUMMARY

An object of the present disclosure is to provide a noise reduction device for audio equipment that can achieve two-way noise reduction.

In order to achieve the above object, the present disclosure adopts the following technical solution: a noise reduction device for audio equipment, including: a microprocessor; a digital signal processor electrically connected to the microprocessor; the digital signal processor including an uplink signal processing module and a downlink signal processing module; a host computer interface configured to connect to a host computer; the host computer interface being electrically connected to the microprocessor; and an audio connection terminal configured to connect to the audio equipment; the audio connection terminal being electrically connected to the microprocessor; the uplink signal processing module being configured to perform noise reduction processing on an uplink signal of the audio equipment; the downlink signal processing module being configured to perform noise reduction processing on a downlink signal of the host computer.

In order to achieve the above object, the present disclosure adopts the following technical solution: a noise reduction device for audio equipment, including: a microprocessor; a digital signal processor electrically connected to the microprocessor; the digital signal processor including an uplink signal processing module and a downlink signal processing module; a host computer interface configured to connect to a host computer; the host computer interface being electrically connected to the microprocessor; and an audio connection terminal electrically connected to the microprocessor; the uplink signal processing module being configured to perform noise reduction processing on an uplink signal of the audio equipment; the downlink signal processing module being configured to perform noise reduction processing on a downlink signal of the host computer; wherein the audio connection terminal includes a USB interface; the audio equipment includes a USB earphone; and the USB interface is configured to connect to the USB earphone.

In the present disclosure, the digital signal processor includes the uplink signal processing module and the downlink signal processing module. The uplink signal processing module performs noise reduction processing on the uplink signal of the audio equipment, that is, performs noise reduction processing on a voice signal generated by its own microphone, thereby reducing noise interference and optimizing the quality of voices transmitted to the other party. The downlink signal processing module performs noise reduction processing on the downlink signal of the host computer, that is, performs noise reduction processing on the voice signal generated by its own speaker, thereby reducing noise interference and optimizing the quality of the voice one party hears, so as to achieve two-way noise reduction.

DETAILED DESCRIPTION

Figure 1:
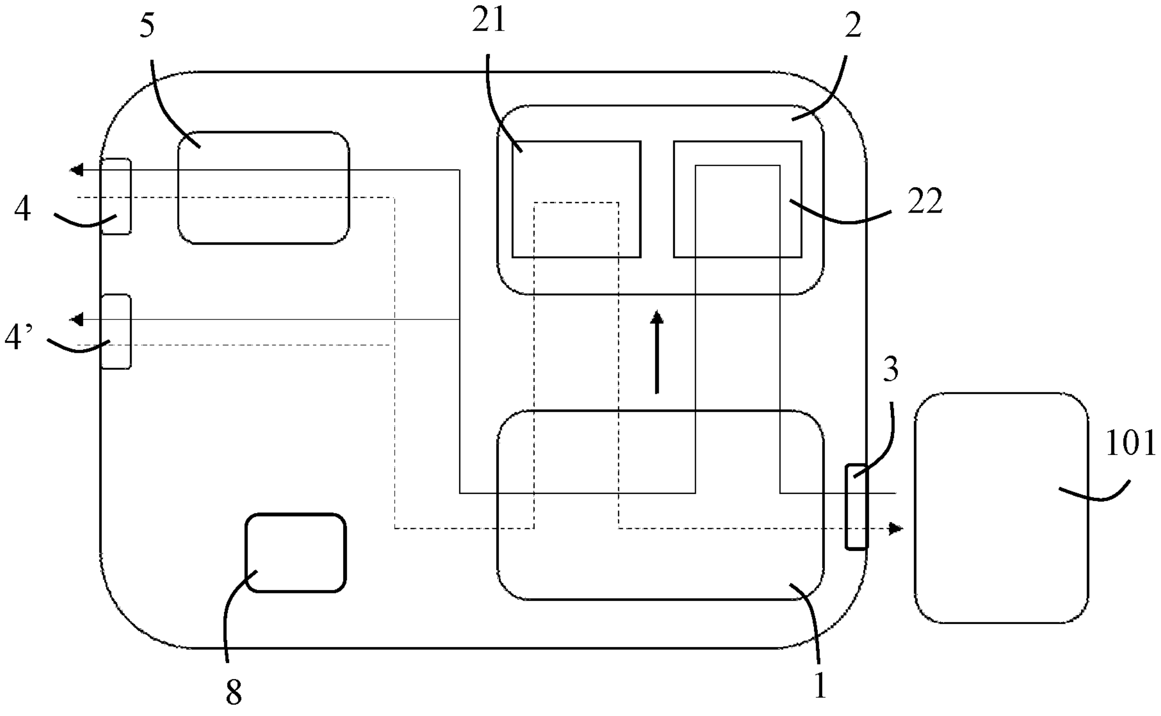
FIG. 1 is a schematic block diagram in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses a noise reduction device for audio equipment, which includes a microprocessor 1, a digital signal processor 2, a host computer interface 3 and an audio connection terminal. The microprocessor 1 is electrically connected to the digital signal processor 2. The host computer interface 3 is configured to connect to a host computer 101. The host computer interface 3 is electrically connected to the microprocessor 1. The audio connection terminal is configured to connect to the audio equipment. The audio connection terminal 4' is electrically connected to the microprocessor 1.

Figure 2:
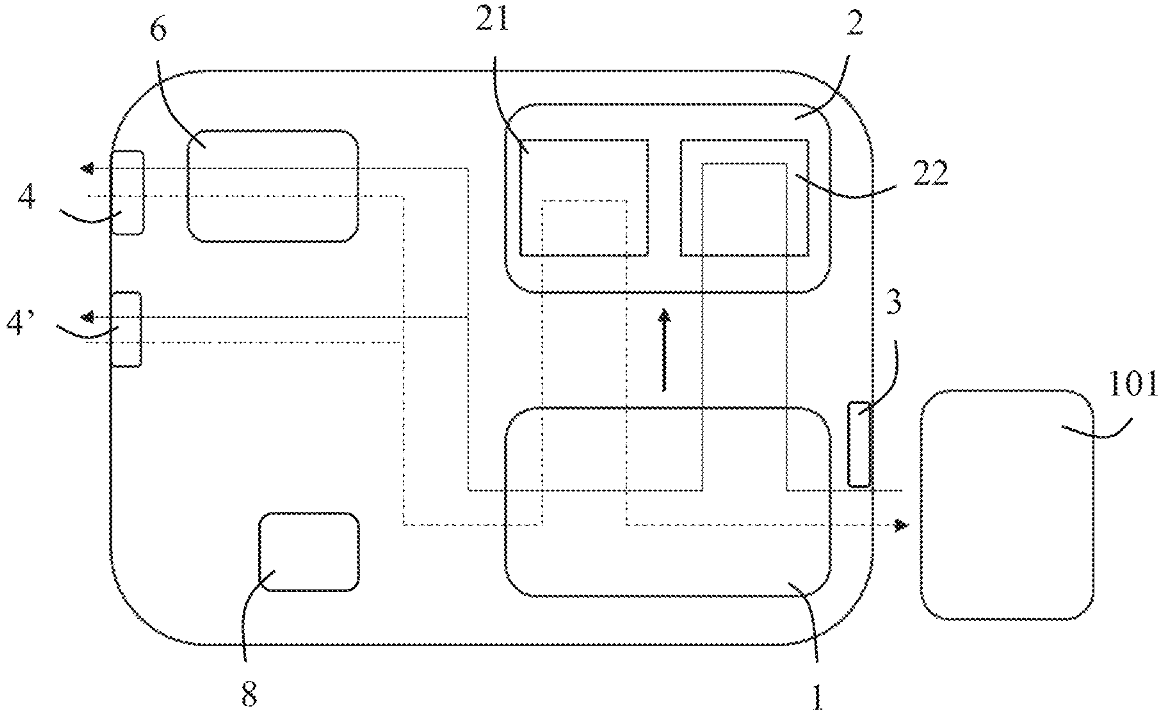
FIG. 2 is a functional block diagram in accordance with a second embodiment of the present disclosure.

In some embodiments, as shown in FIGS. 1 and 2, the digital signal processor 2 includes an uplink signal processing module 21 and a downlink signal processing module 22. The audio equipment includes at least one speaker and at least one microphone. A voice signal of the microphone is an uplink signal, that is, the voice signal transmitted from one party to the other party. A voice signal from the speaker is a downlink signal. The uplink signal processing module 21 is configured to perform noise reduction processing on the uplink signal of the audio equipment, that is, perform noise reduction processing on the voice signal generated by its own microphone, thereby reducing noise interference and optimizing the quality of voices transmitted to the other party. The downlink signal processing module 22 is configured to perform noise reduction processing on the downlink signal of the host computer 101, thereby achieving two-way noise reduction. That is, noise reduction processing is performed on the voice signal generated by its own speaker, thereby reducing noise interference and optimizing the quality of the voice the one party hears, so as to achieve the two-way noise reduction.

The microprocessor 1 is a core component of the noise reduction device for audio equipment. Further, referring to FIG. 3 and FIG. 4, the microprocessor 1 includes an MCU processing chip 10. The MCU processing chip 10 has an I2S0 pin, an I2S1 pin and an I2C pin. The digital signal processor 2 includes a digital signal processing chip 20. The I2S0 pin, the I2S1 pin and the I2C pin are all electrically connected to the digital signal processing chip 20. The digital signal processing chip 20 includes the uplink signal processing module 21 and the downlink signal processing module 22. Specifically, the I2S0 pin and the I2S1 pin are bidirectionally connected to the digital signal processing chip 20. The I2C pin is unidirectionally connected to the digital signal processing chip 20.

In some embodiments, the audio connection terminals include a first audio connection terminal 4 and a second audio connection terminal 4'. The first audio connection terminal 4 and the second audio connection terminal 4' are both configured to connect to the audio equipment. The first audio connection terminal 4 and the second audio connection terminal 4' are both electrically connected to the microprocessor 1.

Figure 3:
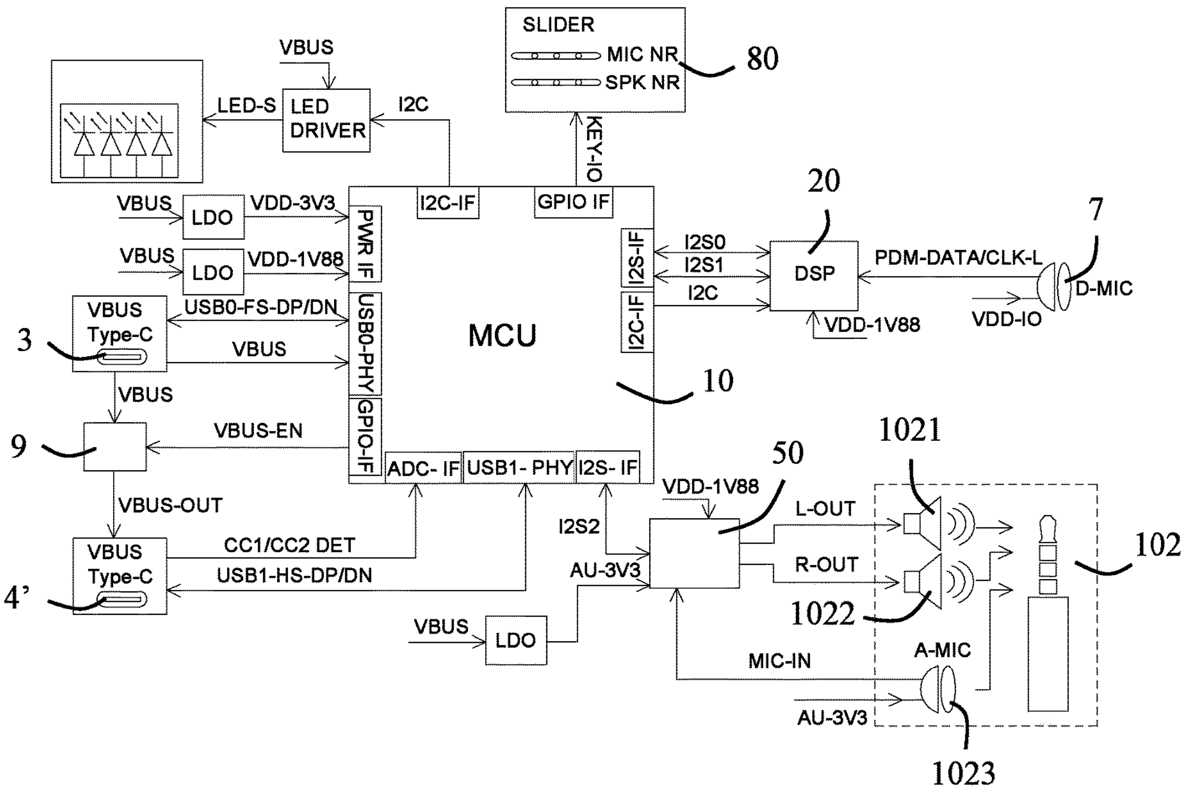
FIG. 3 is a circuit connection diagram in accordance with a first embodiment of the present disclosure.

In a first embodiment, as shown in FIGS. 1 and 3, the first audio connection terminal 4 is a TRS-type terminal interface. The TRS-type terminal interface is configured to connect to the TRS-type terminal earphone 102. The TRS-type terminal earphone 102 refers to an earphone using a TRS-type terminal plug. The TRS-type terminal plug is connected to the TRS-type terminal interface. In a second embodiment, the first audio connection terminal 4 is configured to connect to a Bluetooth earphone. The Bluetooth earphone refers to a wireless earphone. That is to say, the first audio connection terminal 4 is configured to connect to one of the TRS-type terminal earphone 102 and the Bluetooth earphone.

The TRS-type terminal is commonly used to connect audio equipment to a connector for transmitting audio signals. This type of plug is generally used to connect an earphone and a microphone, collectively referred to as TRS. However, they can also be called TS (single-channel), TRS (two-channel), and TRRS (two-channel and microphone) according to the specific number of rings of a plug and a socket.

As shown in FIGS. 1 and 3, when the first audio connection terminal 4 is configured to connect to the TRS-type terminal earphone 102, the noise reduction device for audio equipment includes an audio codec 5. The first audio connection terminal 4 is a TRS-type terminal interface capable of being connected to the TRS-type terminal plug of the TRS-type earphone 102. The TRS-type terminal plug is connected to the TRS-type terminal interface, so that the TRS-type terminal earphone 102 is electrically connected to the audio codec 5. The audio codec 5 is electrically connected to the microprocessor 1.

Figure 4:
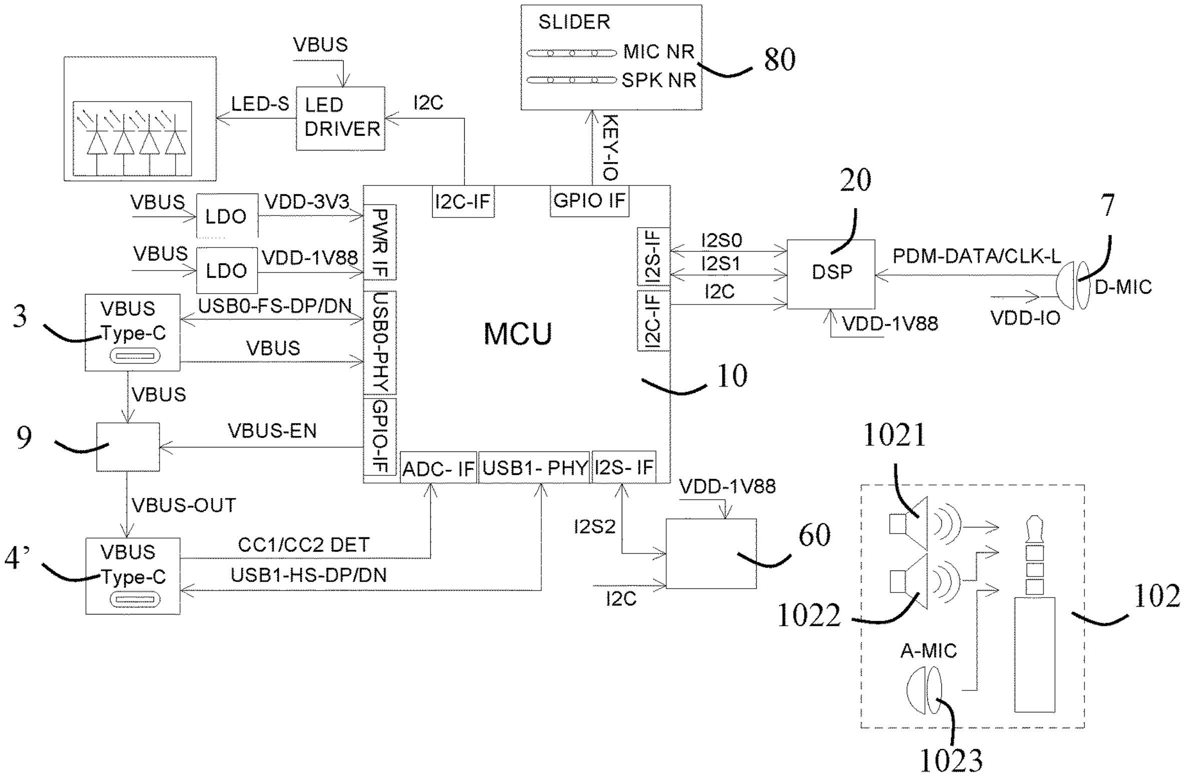
FIG. 4 is a circuit connection diagram in accordance with a second embodiment of the present disclosure.

As shown in FIGS. 2 and 4, when the first audio connection terminal 4 is configured to connect to the Bluetooth earphone, the noise reduction device for audio equipment includes a wireless transceiver 6. The wireless transceiver 6 is the first audio connection terminal 4. The Bluetooth earphone is communicatively connected to the wireless transceiver 6. The wireless transceiver 6 is electrically connected to the microprocessor 1.

In some embodiments, the microprocessor 1 is electrically connected to one of the audio codec 5 or the wireless transceiver 6. When the noise reduction device for audio equipment is adapted to the TRS-type terminal earphone 102, the noise reduction device for audio equipment is integrated by integrating the audio codec 5 with the microprocessor 1 and the digital signal processor 2, etc. At this time, the noise reduction device for audio equipment cannot be adapted to the Bluetooth earphone. When the noise reduction device of the audio equipment is adapted to the Bluetooth earphone, the noise reduction device for audio equipment is integrated with the wireless transceiver 6, the microprocessor 1 and the digital signal processor 2, etc. At this time, the noise reduction device for audio equipment cannot be adapted to the TRS-type terminal earphone 102. Of course, in other embodiments, the microprocessor 1 can be electrically connected to the audio codec 5 and the wireless transceiver 6 at the same time, so that the noise reduction device of the audio equipment is connected to the TRS-type terminal earphone 102 and the Bluetooth earphone at the same time.

In some embodiments, the second audio connection terminal 4' is a USB interface. The USB interface is configured to connect a USB earphone. The USB earphone include a USB wired earphone and a USB wireless earphone. The USB wired earphone refers to a earphone using a USB plug. The USB plug is connected to the USB interface. The USB wireless earphone includes an adapter and a wireless earphone. The adapter uses a USB plug. The USB plug of the adapter is connected to the USB interface. The wireless earphone is communicatively connected to the adapter. That is to say, the USB interface is configured to connect the USB wired earphone or the USB wireless earphone. According to needs, the noise reduction device for audio equipment can be connected to one or more of the audio equipment such as the TRS-type terminal earphone, the USB wired earphone, the USB wireless earphone and the Bluetooth earphone.

Specifically, as shown in FIG. 3, the audio codec 5 includes an audio codec chip 50. The audio codec chip 50 has an L-OUT pin, an R-OUT pin and a MIC-IN pin. The TRS-type terminal earphone 102 includes a left speaker 1021, a right speaker 1022 and a microphone 1023. After the TRS-type terminal earphone 102 is inserted into the TRS-type terminal interface, the left speaker 1021 can be electrically connected to the L-OUT pin, the right speaker 1022 can be electrically connected to the R-OUT pin, and the microphone 1023 can be electrically connected to the MIC-IN pin.

As shown in FIGS. 3 and 4, the MCU processing chip 10 includes an I2S2 pin. The wireless transceiver 6 includes an MCU unit 60. The I2S2 pin can be electrically connected to the audio codec chip 50 or the MCU unit 60. Since the microphone of the audio equipment will receive the voices from the external environment, as shown in FIGS. 3 and 4, the noise reduction device for audio equipment includes a noise reduction microphone 7 for noise detection. The noise reduction microphone 7 is electrically connected to the digital signal processing chip 20. The digital signal processing chip 20 can perform noise reduction processing on the voices in the external environment picked up by the noise reduction microphone 7. The noise reduction microphone 7 is used to determine which voices need to be retained (such as the sounds picked up by the microphone of the audio equipment) and which voices need to be eliminated (such as the sounds picked up by the noise reduction microphone 7 of the noise reduction device of the audio equipment). For example, when a user is talking on the phone, there may be other people chatting, having meetings, or broadcasting music and other noises around the user, the noise reduction microphone 7 can be used to increase the judgment of whether the surrounding noise needs to be eliminated or whether it is the user's voice that needs to be preserved. By setting the noise reduction microphone 7, the noise reduction effect of the entire noise reduction device is improved.

Referring to FIGS. 1 and 2, the noise reduction device for audio equipment includes a display module 8. The display module 8 is electrically connected to the MCU processing chip 10. The display module 8 is configured to indicate a currently used path (such as a TRS-type terminal earphone, a USB earphone, or a Bluetooth earphone). The noise reduction device for audio equipment is provided with different noise reduction levels. Referring to FIGS. 3 and 4, the display module 8 includes a sliding switch 80. By operating the sliding switch 80, different noise reduction levels can be selected to meet the different noise reduction needs of users.

Referring to FIGS. 3 and 4, the noise reduction device for audio equipment includes a power switch 9, and the pins of the host computer interface 3 and the USB interface are both electrically connected to the power switch 9.

In use, when the plug of the TRS-type terminal earphone 102 is inserted into the TRS-type terminal interface, the audio codec 5 provides a discrimination signal (such as a voltage signal) to the microprocessor 1. If the TRS-type terminal earphone 102 does not have a microphone, the voltage is zero, and the downlink signal processing module 22 of the digital signal processor 2 performs noise reduction processing on the downlink signal of the host computer 101. If the TRS-type terminal earphone 102 has a microphone, there will be a voltage drop (but the voltage will still exist). The microprocessor 1 notifies the host computer 101 (a mobile phone or a computer) that the audio equipment contains a microphone. The uplink signal processing module 21 of the digital signal processor 2 performs noise reduction processing on the uplink signal of the microphone to eliminate non-user's voice or environmental noise. Similarly, the downlink signal processing module 22 of the digital signal processor 2 performs noise reduction processing on the downlink signal of the host computer 101 to achieve two-way noise reduction.

When the plug of the USB wired earphone is inserted into the USB interface, the microprocessor 1 determines whether the USB wired earphone has a microphone. If the USB wired earphone does not have a microphone, the downlink signal processing module 22 of the digital signal processor 2 performs noise reduction processing on the downlink signal of the host computer 101. If the USB wired earphone is equipped with a microphone, the uplink signal processing module 21 of the digital signal processor 2 performs noise reduction processing on the uplink signal of the microphone to eliminate non-user's voice or environmental noise. Similarly, the downlink signal processing module 22 of the digital signal processor 2 performs noise reduction processing on the downlink signal of the host computer 101 to achieve two-way noise reduction.

When the plug of the adapter of the USB wireless earphone is inserted into the USB interface, the microprocessor 1 determines whether the USB wireless earphone has a microphone. If the USB wireless earphone does not have a microphone, the downlink signal processing module 22 of the digital signal processor 2 performs noise reduction processing on the downlink signal of the host computer 101. If the USB wireless earphone is equipped with a microphone, the uplink signal processing module 21 of the digital signal processor 2 performs noise reduction processing on the uplink signal of the microphone to eliminate non-user's voice or environmental noise. Similarly, the downlink signal processing module 22 of the digital signal processor 2 performs noise reduction processing on the downlink signal of the host computer 101 to achieve two-way noise reduction.

When using a Bluetooth earphone, the microprocessor 1 determines whether the Bluetooth earphone has a microphone. If the Bluetooth earphone does not have a microphone, the downlink signal processing module 22 of the digital signal processor 2 performs noise reduction processing on the downlink signal of the host computer 101. If the Bluetooth earphone is equipped with a microphone, the uplink signal processing module 21 of the digital signal processor 2 performs noise reduction processing on the uplink signal of the microphone to eliminate non-user's voice or environmental noise. Similarly, the downlink signal processing module 22 of the digital signal processor 2 performs noise reduction processing on the downlink signal of the host computer 101 to achieve two-way noise reduction.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A noise reduction device for audio equipment, comprising:

a microprocessor;

a digital signal processor electrically connected to the microprocessor; the digital signal processor comprising an uplink signal processing module and a downlink signal processing module;

a host computer interface configured to connect to a host computer; the host computer interface being electrically connected to the microprocessor; and an audio connection terminal configured to connect to the audio equipment; the audio connection terminal being electrically connected to the microprocessor; the uplink signal processing module being configured to perform noise reduction processing on an uplink signal of the audio equipment; the downlink signal processing module being configured to perform noise reduction processing on a downlink signal of the host computer;

wherein the audio connection terminal comprises a first audio connection terminal; the audio equipment comprises a TRS-type terminal earphone and a Bluetooth earphone; the first audio connection terminal is configured to connect to one of the TRS-type terminal earphone and the Bluetooth earphone;

when the first audio connection terminal is configured to connect to the TRS-type terminal earphone, the noise reduction device for audio equipment comprises an audio codec, the first audio connection terminal is a TRS-type terminal interface capable of being connected to a TRS-type terminal plug of the TRS-type terminal earphone, and the TRS-type terminal plug is connected to the TRS-type terminal interface, so that the TRS-type terminal earphone is electrically connected to the audio codec, and the audio codec is electrically connected to the microprocessor;

when the first audio connection terminal is configured to connect to the Bluetooth earphone, the noise reduction device for audio equipment comprises a wireless transceiver, the wireless transceiver is the first audio connection terminal, the Bluetooth earphone is communicatively connected to the wireless transceiver, and the wireless transceiver is electrically connected to the microprocessor.

2. The noise reduction device for audio equipment according to claim 1, wherein the audio connection terminal comprises a second audio connection terminal; the second audio connection terminal is a USB interface; the audio equipment comprises a USB earphone; and the USB interface is configured to connect to the USB earphone.

3. The noise reduction device for audio equipment according to claim 2, wherein the USB earphone comprise a USB wired earphone and a USB wireless earphone; the USB interface is configured to be connected to the USB wired earphone or the USB wireless earphone; the USB wireless earphone comprises an adapter, the USB interface is configured to be connected to the adapter, and the USB wireless earphone is communicatively connected to the adapter.

4. The noise reduction device for audio equipment according to claim 1, wherein the microprocessor comprises an MCU processing chip; the MCU processing chip has an I2S0 pin, an I2S1 pin and an I2C pin; the digital signal processor comprises a digital signal processing chip; the I2S0 pin, the I2S1 pin and the I2C pin are all electrically connected to the digital signal processing chip; the digital signal processing chip comprises the uplink signal processing module and the downlink signal processing module.

5. The noise reduction device for audio equipment according to claim 4, wherein the I2S0 pin and the I2S1 pin are both bidirectionally connected to the digital signal processing chip.

6. The noise reduction device for audio equipment according to claim 4, wherein the MCU processing chip comprises an I2S2 pin; the wireless transceiver comprises an MCU unit; the audio codec comprises an audio codec chip; the I2S2 pin is electrically connected to the audio codec chip or the MCU unit.

7. The noise reduction device for audio equipment according to claim 6, wherein the audio codec chip has an L-OUT pin, an R-OUT pin and a MIC-IN pin; the TRS-type terminal earphone comprises a left speaker, a right speaker and a microphone; when the TRS-type terminal earphone is connected to the TRS-type terminal interface, the left speaker is configured to electrically connect to the L-OUT pin, the right speaker is configured to electrically connect to the R-OUT pin, and the microphone is configured to electrically connect to the MIC-IN pin.

8. The noise reduction device for audio equipment according to claim 4, further comprising a noise reduction microphone electrically connected to the digital signal processing chip, and the digital signal processing chip being configured to perform noise reduction processing on voices in an external environment picked up by the noise reduction microphone.

9. A noise reduction device for audio equipment, comprising:

a microprocessor;

a digital signal processor electrically connected to the microprocessor; the digital signal processor comprising an uplink signal processing module and a downlink signal processing module;

a host computer interface configured to connect to a host computer; the host computer interface being electrically connected to the microprocessor; and an audio connection terminal configured to connect to the audio equipment; the audio connection terminal being electrically connected to the microprocessor; the uplink signal processing module being configured to perform noise reduction processing on an uplink signal of the audio equipment; the downlink signal processing module being configured to perform noise reduction processing on a downlink signal of the host computer;

wherein the audio connection terminal comprises a second audio connection terminal; the second audio connection terminal is a USB interface; the audio equipment comprises a USB earphone; and the USB interface is configured to connect to the USB earphone;

wherein the noise reduction device further comprises a display module electrically connected to the MCU processing chip; wherein the display module is capable of indicating a currently used path; the noise reduction device for audio equipment has different noise reduction levels; the display module comprises a sliding switch and selection of different noise reduction levels is achieved by operating the sliding switch.

10. The noise reduction device for audio equipment according to claim 9, wherein the audio connection terminal comprises a first audio connection terminal; the audio equipment comprises a TRS-type terminal earphone and a Bluetooth earphone; the first audio connection terminal is configured to connect to one of the TRS-type terminal earphone and the Bluetooth earphone;

when the first audio connection terminal is configured to connect to the TRS-type terminal earphone, the noise reduction device for audio equipment comprises an audio codec, the first audio connection terminal is a TRS-type terminal interface capable of being connected to a TRS-type terminal plug of the TRS-type terminal earphone, and the TRS-type terminal plug is connected to the TRS-type terminal interface, so that the TRS-type terminal earphone is electrically connected to the audio codec, and the audio codec is electrically connected to the microprocessor;

when the first audio connection terminal is configured to connect to the Bluetooth earphone, the noise reduction device for audio equipment comprises a wireless transceiver, the wireless transceiver is the first audio connection terminal, the Bluetooth earphone is communicatively connected to the wireless transceiver, and the wireless transceiver is electrically connected to the microprocessor.

11. The noise reduction device for audio equipment according to claim 9, wherein the audio connection terminal comprises a second audio connection terminal; the second audio connection terminal is a USB interface; the audio equipment comprises a USB earphone; and the USB interface is configured to connect to the USB earphone.

12. A noise reduction device for audio equipment, comprising:

a microprocessor;

a digital signal processor electrically connected to the microprocessor; the digital signal processor comprising an uplink signal processing module and a downlink signal processing module;

a host computer interface configured to connect to a host computer; the host computer interface being electrically connected to the microprocessor; and an audio connection terminal electrically connected to the microprocessor; the uplink signal processing module being configured to perform noise reduction processing on an uplink signal of the audio equipment; the downlink signal processing module being configured to perform noise reduction processing on a downlink signal of the host computer;

wherein the audio connection terminal comprises a USB interface; the audio equipment comprises a USB earphone; and the USB interface is configured to connect to the USB earphone;

wherein the audio connection terminal comprises a first audio connection terminal; the audio equipment comprises a TRS-type terminal earphone and a Bluetooth earphone; the first audio connection terminal is configured to connect to one of the TRS-type terminal earphone and the Bluetooth earphone;

when the first audio connection terminal is configured to connect to the TRS-type terminal earphone, the noise reduction device for audio equipment comprises an audio codec, the first audio connection terminal is a TRS-type terminal interface capable of being connected to a TRS-type terminal plug of the TRS-type terminal earphone, and the TRS-type terminal plug is connected to the TRS-type terminal interface, so that the TRS-type terminal earphone is electrically connected to the audio codec, and the audio codec is electrically connected to the microprocessor;

when the first audio connection terminal is configured to connect to the Bluetooth earphone, the noise reduction device for audio equipment comprises a wireless transceiver, the wireless transceiver is the first audio connection terminal, the Bluetooth earphone is communicatively connected to the wireless transceiver, and the wireless transceiver is electrically connected to the microprocessor.

13. The noise reduction device for audio equipment according to claim 12, wherein the audio connection terminal comprises a second audio connection terminal which is the USB interface.

14. The noise reduction device for audio equipment according to claim 13, wherein the USB earphone comprise a USB wired earphone and a USB wireless earphone; the USB interface is configured to be connected to the USB wired earphone or the USB wireless earphone; the USB wireless earphone comprises an adapter, the USB interface is configured to be connected to the adapter, and the USB wireless earphone is communicatively connected to the adapter.

15. The noise reduction device for audio equipment according to claim 12, wherein the microprocessor comprises an MCU processing chip; the MCU processing chip has an I2S0 pin, an I2S1 pin and an I2C pin; the digital signal processor comprises a digital signal processing chip; the I2S0 pin, the I2S1 pin and the I2C pin are all electrically connected to the digital signal processing chip; the digital signal processing chip comprises the uplink signal processing module and the downlink signal processing module.

16. The noise reduction device for audio equipment according to claim 15, wherein the I2S0 pin and the I2S1 pin are both bidirectionally connected to the digital signal processing chip.

17. The noise reduction device for audio equipment according to claim 15, wherein the MCU processing chip comprises an I2S2 pin; the wireless transceiver comprises an MCU unit; the audio codec comprises an audio codec chip; the I2S2 pin is electrically connected to the audio codec chip or the MCU unit.

18. The noise reduction device for audio equipment according to claim 17, wherein the audio codec chip has an L-OUT pin, an R-OUT pin and a MIC-IN pin; the TRS-type terminal earphone comprises a left speaker, a right speaker and a microphone; when the TRS-type terminal earphone is connected to the TRS-type terminal interface, the left speaker is configured to electrically connect to the L-OUT pin, the right speaker is configured to electrically connect to the R-OUT pin, and the microphone is configured to electrically connect to the MIC-IN pin.

19. The noise reduction device for audio equipment according to claim 15, further comprising a noise reduction microphone electrically connected to the digital signal processing chip, and the digital signal processing chip being configured to perform noise reduction processing on voices in an external environment picked up by the noise reduction microphone.

20. The noise reduction device for audio equipment according to claim 13, further comprising a display module electrically connected to the MCU processing chip; wherein the display module is capable of indicating a currently used path; the noise reduction device for audio equipment has different noise reduction levels; the display module comprises a sliding switch and selection of different noise reduction levels is achieved by operating the sliding switch.

* * * * *